United States Patent [19]

Galloway et al.

[11] 4,215,394
[45] Jul. 29, 1980

[54] CONTROL LOGIC FOR AN INVERTER RIPPLE CONTROLLED POWER SYSTEM

[75] Inventors: James H. Galloway, New Baltimore; Alby M. Berman, Oak Park, both of Mich.

[73] Assignee: Oxy Metal Industries Corp., Warren, Mich.

[21] Appl. No.: 920,482

[22] Filed: Jun. 29, 1978

[51] Int. Cl.² .......................................... H02M 7/515
[52] U.S. Cl. ....................................... 363/137; 307/3; 340/310 A
[58] Field of Search ........... 307/1, 3; 340/288, 310 R, 340/310 A; 363/137, 138

[56] References Cited

U.S. PATENT DOCUMENTS

| | | | |
|---|---|---|---|
| 3,207,974 | 9/1965 | McMurray | 363/136 |
| 3,710,230 | 1/1973 | VeNard | 363/138 |
| 4,021,797 | 5/1977 | Hofmeister | 340/310 A |
| 4,024,528 | 5/1977 | Boggs et al. | 340/310 A |
| 4,060,735 | 11/1977 | Pascucci et al. | 340/310 A |
| 4,130,861 | 12/1978 | LaForest | 363/39 |

Primary Examiner—William M. Shoop
Attorney, Agent, or Firm—Harness, Dickey & Pierce

[57] ABSTRACT

A load management system utilizing a three phase solid state inverter for applying a ripple signal on a high voltage line with the system having means (a) for conducting backfeed current from the line through a portion of the inverter, (b) for balancing the current and phase distribution through an isolation transformer, (c) for selectively sequentially connecting and disconnecting the transmission of the ripple signal from the high voltage line, (d) for providing a wide angle of conduction to assure conduction of the solid state devices over a wide time period to avoid current imbalance and core saturation.

14 Claims, 5 Drawing Figures

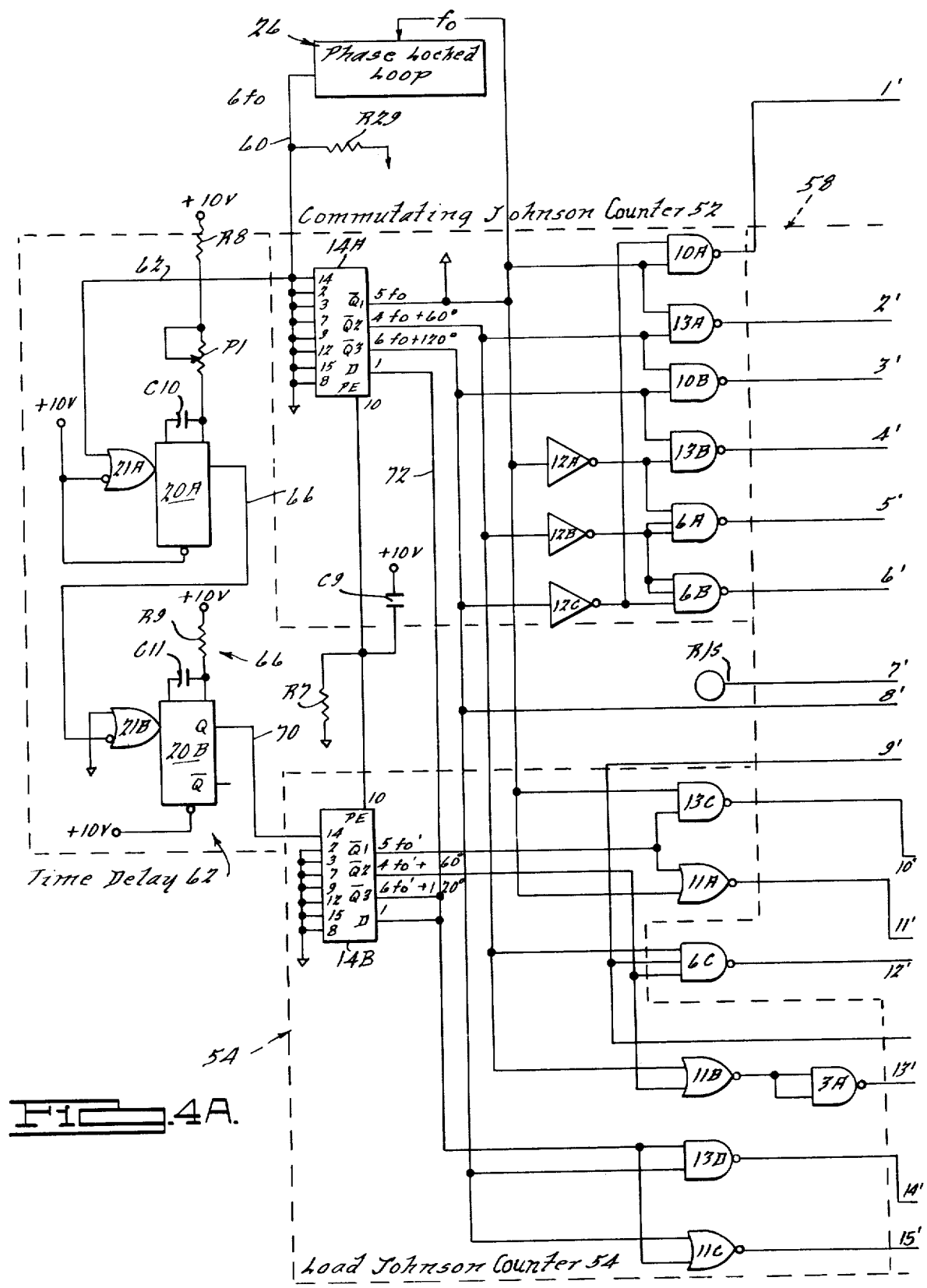

FIG. 4B.

CONTROL LOGIC FOR AN INVERTER RIPPLE CONTROLLED POWER SYSTEM

BACKGROUND-SUMMARY OF THE INVENTION

The present invention relates to pulse coded inverters for utility load management systems and more particularly to control apparatus for pulse coding static inverters for utility load management systems.

In electrical utility systems various types of load management control have been employed. With load management control, the utilities have the capability of interrupting service to non-critical loads during times of peak power demand. In the past such control has been exercised by timing devices, signals from telephone lines, radio signals and ripple control.

The present invention is directed to load management utilizing ripple control.

In a ripple control system, an audio frequency signal is impressed directly onto the utility's power lines and is transmitted along with and superimposed upon the high voltage being transmitted. The signal is pulse coded to provide individual channels of information. Thus the signal gives two levels of selection and identification for signal security, i.e. the magnitude of the audio frequency and the particular code of the pulses. Hence a wide selection of channels is available through pulse coding, and adjacent coupled power systems are protected from interference by audio tone diversity. This system allows the utility full control over its communication network, and permits it to transmit over substantial distances.

Ripple control transmitters have, until recently, been electromechanical in nature. These usually consisted of a motor/alternator set operating through thyristor static switches to apply the pulse coding. The alternator, however, is specific to a given audio frequency and must be specially constructed for each application.

In the present invention the high power audio frequency pulses are produced by a solid state static inverter and superimposed on the network by means of a suitable coupling network. The static audio-frequency transmitters are better suited to this purpose than the previously used rotary converters. They can be installed without any foundations in closed operating rooms provided for electrical equipment. They operate with high frequency accuracy. The frequency is adjustable and is independent of the network frequency. They are instantly ready for operation since there is no long starting time. One important advantage of the static transmitter over the rotary converter is the totally synchronous injection of the audio-frequency pulse code in the case of several separate transmitters in meshed networks. Therefore, there will be no beat in any connected network sections which may cancel the signal. Synchronous and equal-phase injection can be insured by means of a central control.

Thus with systems of the present invention receivers are located at a customer's line and are adapted to recognize both a selected low frequency pulse code and a relatively high frequency signal. The high frequency signal is in the audio range and can be varied from 300 to 1500 Hz. The pulse code will be at a much lower frequency. Thus with two distinct signal components required, the possibility of error at the receiver is reduced. Loads of different character can be controlled by different pulse codes permitting the utility a wide range of selectivity in its load control.

Since the control signals must be injected onto the high voltage transmission line, there will be induced backfeed currents and these must be handled by the static inverter. The apparatus of the present invention handles the backfeed current during all modes of operation of the ripple control system while preventing buildup of excessive voltage from the transmission line.

The control signals are injected onto the transmission line via an isolation transformer. It has been found that core saturation can occur from unidirectional current and/or phase imbalance; if this occurs, the impedance of the transformer can be reduced possibly resulting in currents of high magnitude and potential damage to the associated apparatus. Such imbalance has been precluded in the present sysem by providing that the signal current through the isolation transformer will be equally balanced between positive and negative half cycles as well as from phase to phase whereby core saturation will be precluded.

Therefore, it is an object of the present invention to provide an improved ripple control system for electrical utility load management.

It is another object of the present invention to provide an improved static inverter and control logic therefor for a ripple control system.

Other objects, features, and advantages of the present invention will become apparent from the subsequent description and the appended claims, taken in conjunction with the accompanying drawings, in which:

FIGS. 4 and 4B combined are a schematic diagram of that portion of the block diagram of FIG. 1 designated as "Inverter Logic".

Figure 1:
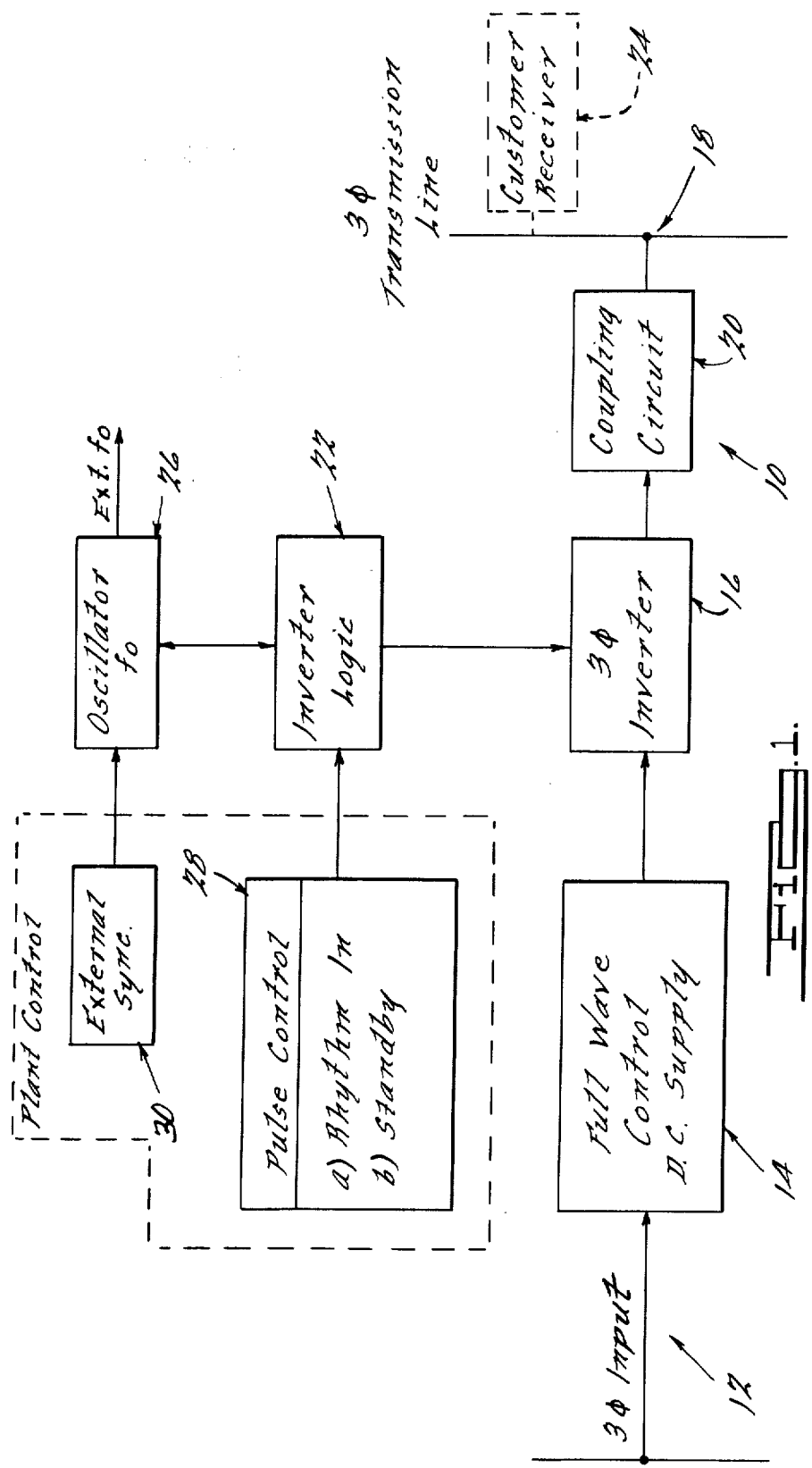
FIG. 1 is a block diagram of a ripple control utility load management system and including the apparatus of the present invention.

Looking now to FIG. 1 the static ripple control system is generally indicated by the numeral 10 and includes a source of three phase power 12 which is connected to the input of a Full Wave Controlled D.C. Supply 14. In one form of the system 10 the input was received from a 480 volt a-c, three phase 60 Hz source, which is readily available at the electric utility. The output from D.C. Supply 14 is a direct voltage of a preselected magnitude (650 volt d-c in one system) and is connected to the input of a 3φ Inverter 16. The Inverter 16 in turn is connected to a high voltage Transmission Line 18 via a Coupling Circuit 20. The conduction of the Inverter 16 is controlled by an Inverter Logic Circuit 22 such that the Inverter 16 is capable of injecting onto the Transmission Line 18 a selected high frequency signal coded or pulsed at a selected low frequency rhythm. A Customer Receiver 24 connected to the line delivering energy from the Transmission Line 18 is set to recognize the high frequency signal and the coded low frequency rhythm and when both are detected the Receiver 24 will be actuated to interrupt a selected portion of that customer's service and with a different coded rhythm to re-energize the same. It should be understood that the block diagram of FIG. 1 is representative only and hence while the Transmission Line 18 can be at a high voltage (such as 69 KV in one system), the customer's voltage will most likely be significantly less; the ripple signal, however, is injected on the noted high voltage and will flow through the entire distribution system including the various voltage reductions at substations, etc., until it reaches the customer's Receiver 24.

The Inverter Logic 22 obtains its high frequency signal, fo, from an Oscillator 26. It receives its coded pulse signal from the Pulse Control 28. The Pulse Control 28 can have two modes of operation: (a) Rhythm In and (b) Standby. In the Rhythm In mode the utility selects and transmits to Logic 22 the desired code to interrupt or re-establish service to selected customer loads. In the Standby mode the system 10 is electrically connected to the Transmission Line 18 but is not injecting a ripple signal and hence no service control will occur.

In one form of the invention Oscillator 26 has an external output which can be selectively connected to other distribution systems such that these distribution systems can be controlled synchronously utilizing the same frequency signal, fo, thereby precluding the possibility of cancellation or beat frequency signals.

In another form of the invention the frequency, fo, of Oscillator 26 can be varied by a signal from an External Sync 30 thereby providing still another means of coding for load control.

Figure 2:
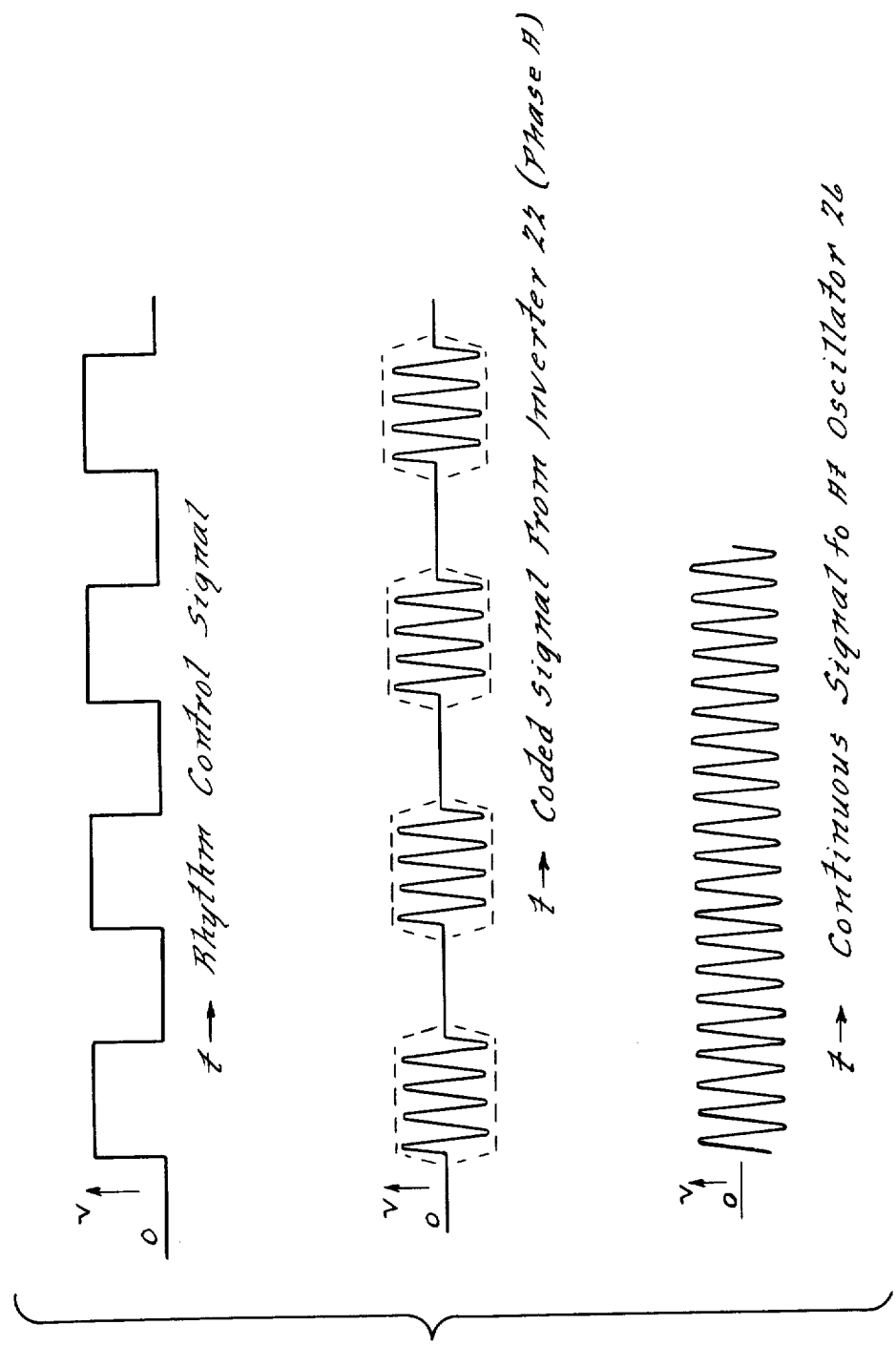
FIG. 2 is a diagram of the various signals effective to provide the ripple control signal.

FIG. 2 depicts the wave diagrams of the components of the ripple signal. Thus in FIG. 2 the high frequency signal, fo, is shown as being continuously generated via Oscillator 26. When the rhythm control signal is injected there occurs a plurality of low frequency pulses. The result is a coded signal representing the generated signal, fo, being pulsed at the rhythm signal. As noted the signal, fo, is an audio signal, which in one system was in the range of 300 to 1500 Hz although the frequency can be less than 300 and at least as high as 20,000 Hz. In one system the rhythm signal had a duration of from 45 msec to 605 msec consisting of 50 discrete durations or coded signals with a duty cycle to off time ratio of 1:1.

Figure 3:
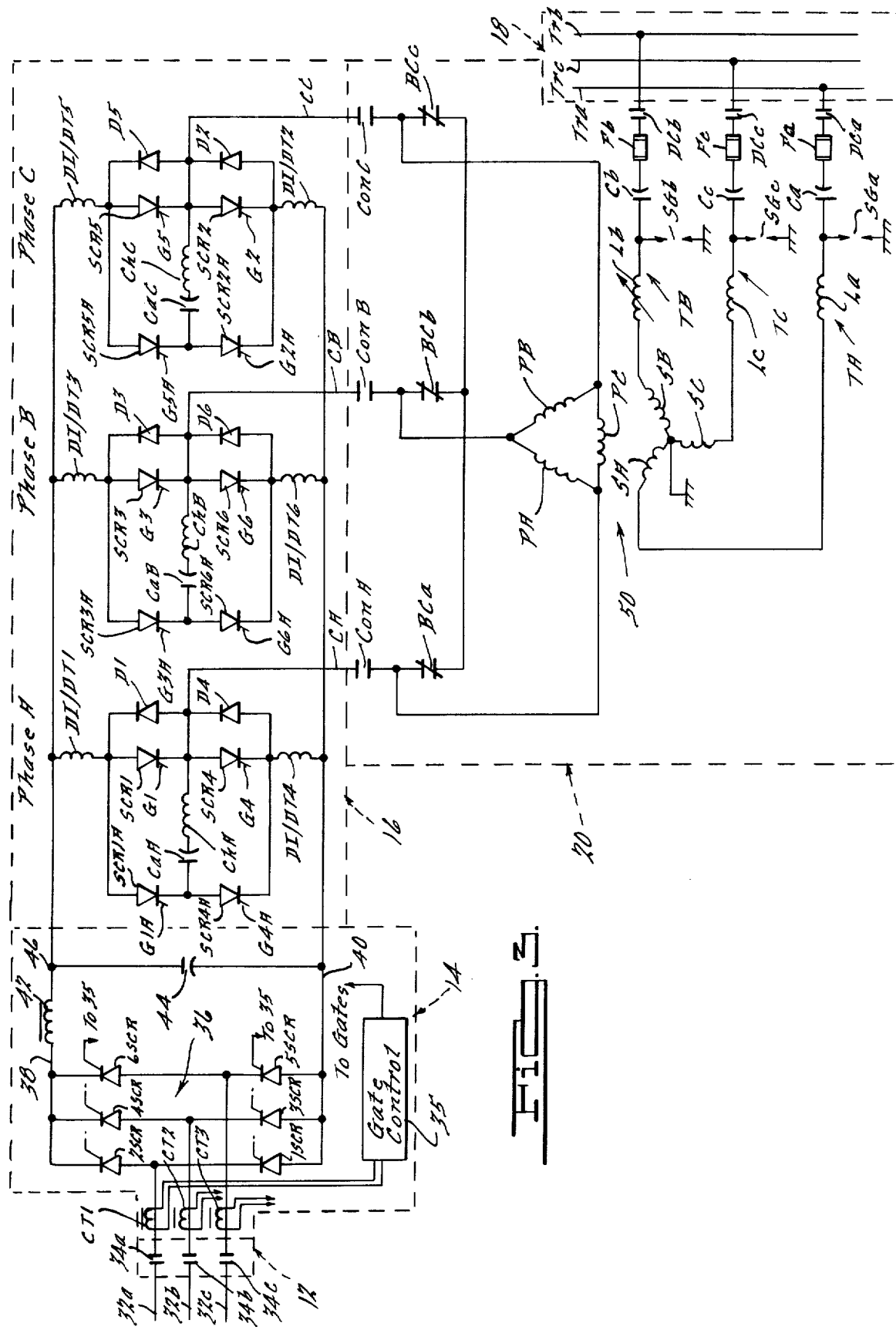
FIG. 3 is a schematic diagram of that portion of the block diagram of FIG. 1 designated as "3φ Input", "Full Wave Controlled D.C. Supply", "3φ Inverter", "Coupling Circuit" and "3φ Transmission Line"

Looking now to FIG. 3, the 3φ Input 12 comprises three conductors 32a, b and c for connection to a three phase source (in one form, 480 Vac, 60 Hz). Circuit breaker contacts 34a, b and c provide a means for connecting and disconnecting the conductors 32a, b and c from the D.C. Supply 14. D.C. Supply 14 comprises a conventional three phase full wave rectifier bridge 36. The bridge 36 includes a plurality of unidirectional controlled conduction devices 1SCR-6SCR; conductor 32a is connected between 1SCR and 2SCR, conductor 32b between 3SCR and 4SCR, and conductor 32c between 5SCR and 6SCR. Current transformers CT1, CT2 and CT3 can provide gate signals via a gate control network 35. The d-c output from bridge 36 appears between conductors 38 and 40 and is smoothed via a filter circuit comprising a series connected filter choke 42 and a parallely connected filter capacitor 44. The circuit 36 can be one known to those skilled in the art and hence the details of the gate control network and associated circuitry have been omitted for purposes of simplicity.

The d-c voltage at conductor 46 provides the input for the 3φ Inverter 16 which comprises three portions noted as Phase A, B and C. The Inverter 16 can be of a class of McMurray inverter well known in the art. In Inverter 16, Phase A comprises unidirectional controlled devices SCR1 and SCR4 which are serially connected via DI/DT Chokes 1 and 4. The conduction of SCR's 1 and 4 are controlled via gate signals applied to their gate electrodes G1 and G4, respectively. The SCR's 1 and 4 are commutated off via a commutation circuit which includes serially connected commutation SCR's 1A and 4A and free wheeling diodes D1 and D4. Commutating choke ChA and Commutating Capacitor CaA are serially connected between the juncture of SCR1A and 4A and the juncture of SCR1 and 4. Commutating SCR's 1A and 4A are controlled via their gate electrodes G1A and G4A, respectively. Each of the other phases B and C are similarly constructed. Thus Inverter Phase B includes SCR's 3 and 6 controlled by gate electrodes G3 and G6, respectively and serially connected to DI/DT Chokes 3 and 6. The Commutation circuit for Phase B includes SCRs 3A and 6A controlled by gate electrodes G3A and G6A, respectively, and free wheeling diodes D3 and D6; the commutation circuit also includes Commutation Capacitor CaB and Commutation Choke ChB. In like manner Phase C includes SCRs 2 and 5 controlled by gate electrodes G2 and G5, respectively, and serially connected to DI/DT Chokes 2 and 5. The commutation circuit for Phase C includes SCRs 2A and 5A controlled by gate electrodes G2A and G5A, respectively, and free wheeling diodes D2 and D5; the commutation circuit also includes Commutation Capacitor CaC and Commutation Choke CaC.

As will be seen the Phases A, B and C operate in a sequence such that associated pairs of SCRs i.e. SCR1 and SCR4, SCR3 and SCR6, and SCR2 and SCR5, will conduct 180° apart and SCRs 1 through 6 will fire in sequence 60° apart whereby the conventional three phase output, i.e. 180° conduction, will be provided at Output Conductors CA, CB and CC. Output Conductors CA, CB, CC, (connected at the junction of associated pairs of SCRs 1 and 4, 3 and 6 and 2 and 5, respectively,) can be connected or disconnected to the Coupling Circuit 20 via selectively actuable Isolation Contactors ConA, ConB and ConC. Output Conductors CA, CB, and CC are thence connected to three legs of primary windings, PA, PB and PC of a three phase isolation transformer 50 which is delta connected. The associated secondary windings SA, SB and SC are WYE connected with a grounded center and couple the signals at the primary windings to a plurality of tuned circuits Ta, Tb and TC which in turn are connected to secondary legs SA, SB and SC, respectively.

Each tuned circuit comprises serially connected inductors and capacitors, i.e. La and Ca, Lb and Cb, and Lc and Cc. The tuned circuits Ta, Tb and Tc are tuned to the frequency to be transmitted, i.e. fo, and are preferably high Q circuits. High voltage transient protection is provided by spark gap circuits SGa, SGb and SCc and fuses Fa, Fb and Fc. Disconnect Contactors DCa, DCb and DCc provide means for disconnecting the tuned circuits Ta, Tb and Tc from three phase transmission lines Tra, Trb and Trc, respectively of Transmission Line 18.

Breaker contactors BCa, BCb and BCc are connected at the outputs of Phases A, B and C and can be closed to provide a low impedance for the backfeed current from the Transmission Line 18 such that the Inverter 16 can be isolated from the Line 18 via contactors Con A, B and C.

As will be seen, in operation, the signal generated by Oscillator 26 is used via Logic 22 to provide appropriate trigger signals to gates G1-G6 to fire main or load SCRs 1–6 in proper sequence. At different times but in proper phased coordination, gates G1A-G6A are triggered to fire commutating SCRs 1A-6A whereby the appropriate commutation takes place to extinguish main SCR's 1–6 in appropriate sequence. While for three phase operation, three of the main SCRs 1–6 can be simultaneously in conduction under no circumstances can an associated pair of those SCRs i.e. SCR1 and 4, 3 and 6, or 2 and 5, be simultaneously in conduction since this will result in a short circuit condition. Thus the Logic 22 provides main SCR gate pulses and commutation SCR gate pulses in the proper sequence to assure the generation of the appropriate three phase audio frequency signal at output conductors CA, CB and CC.

An examination of the circuit of FIG. 3 shows that current will be fed back from the Transmission Line 18 via secondary windings SA, SB, SC into primary windings PA, PB, PC into the Inverter 16. While the Inverter 16 is transmitting, i.e. Rhythm In mode, the backfeed current will circulate through the main SCRs 1–6 and free wheeling Diodes D1-D6 and no voltage buildup will occur. However, when Inverter 16 is not transmitting the backfeed current could result in a buildup of excessive voltage at conductor 46. It is to be remembered that the voltage at Transmission Line 18 may be 69 KV as compared in one system to a voltage of around 650 volts d-c at line 46. The Diodes D1—D6 would define for the backfeed current a full wave, three phase rectifier hence permitting an undesired buildup of voltage at conductor 46 when Inverter 16 is not transmitting.

This is avoided in the present invention by continuously rendering the lower set of main SCR's 2, 4 and 6 conductive, hence always providing a circulating path for the backfeed current. This is done in a manner to be described.

As mentioned previously, if the current through transformer 50 is not balanced between positive and negative half cycles and/or phases, core saturation could occur resulting in a drastic reduction in inductive impedance of isolating transformer 50 whereby its effectiveness to transmit the injected signal would be impeded. In addition a possible short circuit path for the Inverter 16 could result. This is prevented by providing for the initiation of conduction of the main SCRs 1–6 in a predetermined sequence such that conduction is always initiated on the positive half cycle of Phase A and is terminated on the negative half cycle of Phase C with positive phase rotation, i.e. A, B, C. The above will be seen from the description of the Logic Circuit. Saturation is also prevented by providing a large enough gate window for main or load SCRs 1–6 to permit firing at almost any time for its permitted 180° conduction time. With this in mind, let us now look to the remainder of the circuitry as shown in FIGS. 4A and B.

Figure 4B:
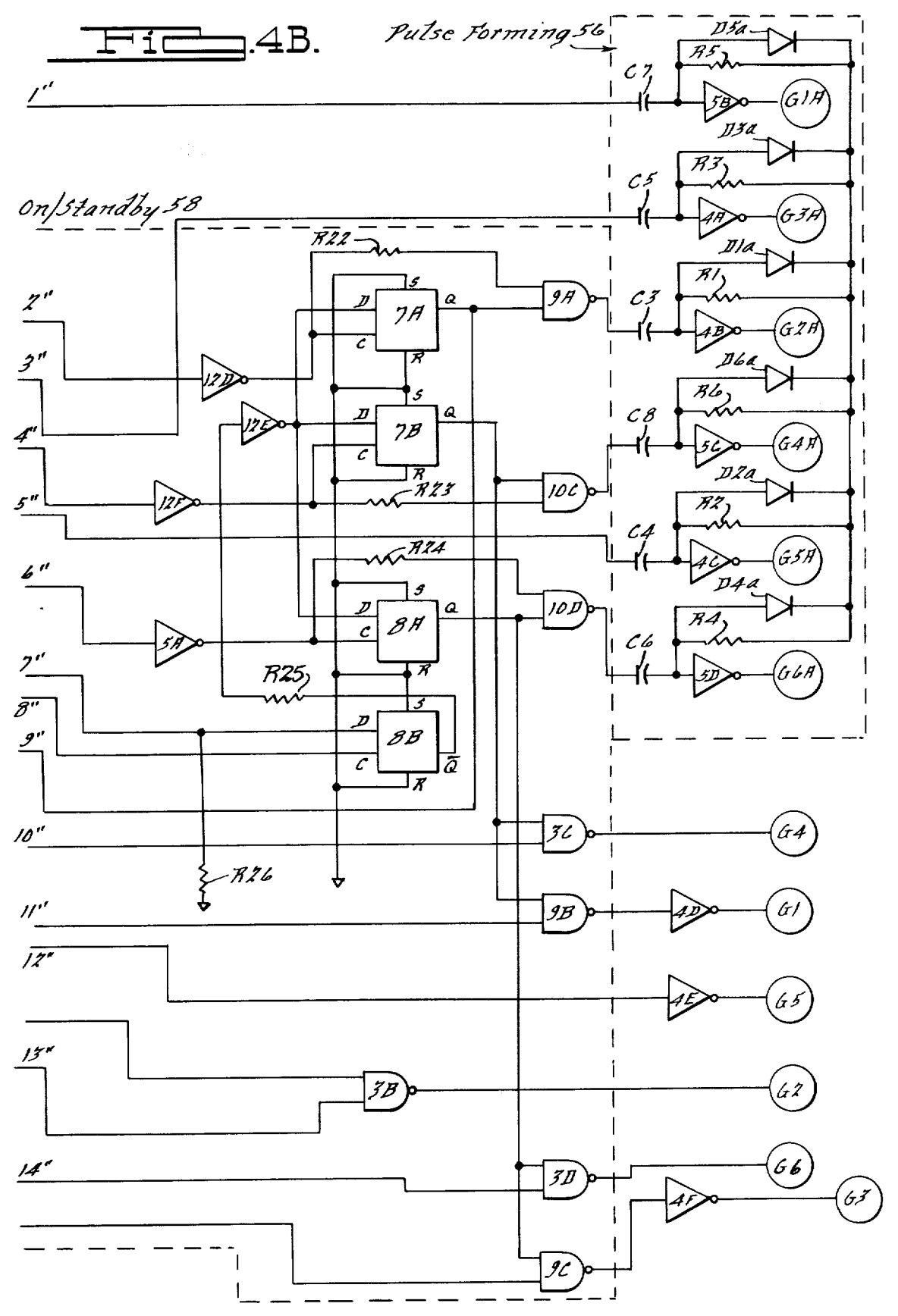

FIGS. 4A and 4B should be considered side-by-side with connections 1'—15' of FIG. 4A corresponding to connections 1"—15" of FIG. 4B. Looking now to FIGS. 4A and B, Oscillator 26 is shown as a phase locked loop controlled oscillator having an input signal of frequency fo and an output signal which is six times fo or 6 fo. As noted fo is the audio frequency component. The signal fo is fed to Logic circuit 22.

The Logic circuit 22 can be considered to include a Commutating Johnson Counter Section 52 for controlling the firing of the commutating SCRs 1A-6A, a Load Johnson Counter Section 54 for controlling the firing of the load or main SCRs 1–6, a Time Delay Section 62 for providing a preselected time delay between commutation and firing of main SCRs, a Pulse Forming Section 56 for providing the firing pulses to the commutating SCRs 1A-6A in response to signals from Johnson Counter Section 52, and an ON/ Standby Section 58 for providing the firing signals for SCRs 2, 4 and 6 to maintain these conductive during standby conditions whereby the backfeed current can be handled without voltage buildup.

While the bottom SCRs 2, 4 and 6 are maintained conductive during standby it is important that the proper charge be maintained on the Commutating Capacitors CaA, CaB and CaC. This is necessary to provide the capability of commutating the lower SCRs 2, 4 and 6 in proper sequence when the apparatus is actuated to be in the transmission or Rhythm In mode. Thus the upper commutating SCRs 1A, 3A and 5A are pulsed in proper sequence to thereby maintain the appropriate charge on Commutating Capacitors CaA, CaB and CaC.

The 6 fo signal from Oscillator 26 is transmitted to the Johnson Counter Section 52 via conductor 60 and load resistor R29 to the Time Delay Section 62. As will be seen the function of the Time Delay Section 62 is to provide a signal fo' each cycle which is delayed by a preselected time interval from signal fo. The fo signal is used to provide the firing signal for commutating SCRs 1A-6A while the delayed signal fo' is used to provide the firing signal for the main or load SCRs 1–6. This is to ensure that commutation of that one of the main or SCRs 1–6 which is to be extinguished occurs prior to firing of the next SCR 1–6 to be rendered conductive. This assures that only three of the load SCRs 1–6 will conduct at one time and further that none of the associated pairs, i.e. SCR's 1 and 4, etc., will be conducting simultaneously.

Thus the timing circuit comprises a One Shot Multivibrator 20A which has a nor gate input 21A which receives the 6 fo signal via line 62. The other input of nor gate 21A is connected to a +10 volt source which source is also connected in conventional manner to one input of the one shot 20A. Another input has a +10 volt source connected therethrough via an R-C timing circuit 64 which comprises a resistor R8, a variable resistor P1 and a capacitor C10. The circuit 64 provides an output signal at conductor 66 having a preselected duration; in one form of the invention the duration was selected as 60 usec. The One Shot 20A triggers on the leading edge of the input 6 fo signal. The output signal at conductor 66 is connected to the input of a nor gate input 21B which is operatively connected with the One Shot Multivibrator 20B. The other input of nor gate 21B is connected to ground. The One Shot 20B has a pair of +10 v inputs with one being transmitted via an RC timing circuit 66 which comprises a resistor R9 and capacitor C11. The One Shot 20B is connected to conduct on the trailing edge of the input signal and hence will provide the output signal 6 fo' at conductor 70 which will be delayed by the predetermined amount from signal 6 fo.

The 6 fo signal at conductor 60 is transmitted to the Commutating Johnson Counter Section 52 and is connected to the input of counter 14A which is connected as a divide-by-six counter. The counter 14A provides three separate outputs at pins 5, 4 and 6 of the signal fo, i.e. fo, fo+60°, and fo+120°, which are set to sequentially occur at 60° intervals. Since in three phase operation, the voltages of each phase are 60° apart, the three fo outputs at counter 14A provide the necessary phased signals. The fo signal at pin 5 is connected to the input of the phase locked loop oscillator 26 to provide synchronization and locking in of the Oscillator 26 signal and that from the counter 14A.

In a similar fashion the 6 fo' signal at conductor 70 is transmitted to the Load Johnson Counter Section 54 and is connected to the input of counter 14B. The counter 14B provides three separate outputs at pins 5, 4 and 6 of the signal fo' which are set to sequentially occur at 60° intervals, i.e. fo', fo'+60°, fo'+120°.

The reset inputs of counters 14A and 14B are connected via conductor 72 and the preset enable inputs of both are commonly connected to a +10 volt d-c supply via capacitor C9 and resistor R7 (which has one side connected to ground). The 60° phased signals fo are connected to a plurality of Nand gates 6A, 6B, 10A, 10B, 13A and 13B and the fo, fo+60° and fo+120° signals are connected to selected pairs of Nand Gates 6A, 6B, etc., with one pair of each being connected via an associated one of Inverters 12A-C. This provides an inverted or 180° signal from each fo signal. The outputs from the Nand Gates 6A, 6B, etc., provide 120° windows and hence will provide six signals 60 degrees apart. The circuit including the Nand Gates 6A, 6B etc., and Inverters 12A-C operate to insure that the resultant six signals are appropriately phased. The 120° windows are fed through the On/Stand-By Section 58 and to the commutating Pulse Forming Section 16 which operates on the trailing edge of the windows to provide trigger pulses which are the signals at gates G1A-G6A for firing the commutating SCRs 1A-6A.

In the "on" or transmit condition the On/Standby circuit 58 acts as a straight through circuit. Thus the outputs from Nand Gates 10A, 10B and 6A are transmitted directly to the Pulse Forming Section 56 while the outputs from Nand Gates 13A, 13B and 6B are connected thereto via Inverters 12D, 12F and 5A, respectively, 'D' Flip Flops 7A, 7B and 8A, respectively, and Nand Gates 9A, 10C, and 10D, respectively. The Flip Flops 7A, 7B and 8A have their "Q" outputs connected to one input of the associated Nand Gates 9A, 10C and 10D. The outputs from the Inverters 12D, 12F and 5A are connected to the inputs of the Flip Flops 7A, 7B and 8A and also to the inputs of Nand Gates 9A, 10C and 10D via Resistors R22, R23 and R24, respectively. During the "on" or transmit condition the Flip Flops 7A, 7B and 8A are conditioned to permit transmission of the 120° window signals to the Pulse Forming Section 56. As will be seen during Standby, i.e. non-transmission, the Flip Flops 7A, 7B and 8A are conditioned to block the 120° window signals to the Pulse Forming Section 56. Thus in Standby the commutation pulses for gates G2A, G4A and G6A are inhibited whereby commutation SCRs 2A, 4A and 6A will not be triggered thus precluding commutation of main or load SCRs 2, 4 and 6. With SCRs 2, 4 and 6 being continuously in conduction the backfeed current can be circulated therethrough and handled during non-transmission as previously noted. At the same time, however, the commutating SCR's 1A, 3A and 5A are continuously pulsed in their normal sequence to provide the proper charge to be maintained on the associated ones of commutating capacitors CaA, CaB and CaC.

The output pulses from Pulse Forming Section 56 are narrow being in one case approximately 20 micro seconds wide at a 10 volt level. Looking to that circuit connected to Nand Gate 10A and which is operative for producing the trigger pulse for gate G1A, the trigger pulse is accomplished via the discharging of a capacitor C7 connected to an Inverter 5B which will go low giving a high output. The output stays high until C7 is charged from a 10 volt d-c source through a charge circuit including Resistor R5 and Diode D5a at which time the input goes high and the output goes low.

In a similar manner the signal from Nand Gate 10B is processed via the pulse forming circuit including Capacitor C5, Resistor R3, Diode D3 and Inverter 4A to form the gate signal for gate G3A; the signal from Nand Gate 13A is processed via the pulse forming circuit including Capacitor C3, Resistor R1, Diode D1A and Inverter 4B to form the gate signal for gate G2A; the signal from Nand Gate 13B is processed via the pulse forming circuit including Capacitor C8, Resistor R6, Diode D6a and Inverter 5C to form the gate signal for gate G4A; the signal from Nand Gate 6A is processed via the pulse forming circuit including Capacitor C4, Resistor R2, Diode D2a, and Inverter 4C to form the gate signal for gate G5A; and the signal from Nand Gate 6B is processed via the pulse forming circuit including Capacitor C6, Resistor R4, Diode D4a and Inverter 5D to form the gate signal for gate G6A.

As noted in the "on" or transmission mode the Flip Flops 7A, 7B and 8A are for all intents and purposes ineffective. These, however, will come into play in the Standby mode as will be seen.

The Johnson Counter Section 54 for the load SCRs 1-6 operates in a manner similar to the Johnson Counter Section 52 for the commutating SCRs 1A-6A. The windows for the load SCR 1-6, however, are 180° minus the time delay (60 usec) mentioned before. This is accomplished through Nand Gates 13C, 6C and 13D and through Nor Gates 11A, 11B and 11C. The Nand Gates 13C, 6C and 13D cooperate with one of the Nor Gates 11A, 11B and 11C, respectively, whereby gates 13C and 11A will provide inverted and non inverted signals from signal fo' and gates 6C, 11B and 13D, 11C will do likewise with signals fo'+60° and fo'+120°, respectively. The output at pin 5 of counter 14B, is fed into Nand Gate 13 C and thence to an Inverter 3C which functions in the "on" or transmission mode of operation. To guarantee that load SCR 4 does not get a gate pulse during its commutation interval, pin 5 of counter 14A is fed into the other input of Nand Gate 13C whereby no gate pulse to load SCR 4 will be present during its commutation interval. As will be seen Nand Gate 6C is also used as part of the On/Standby Section 58. The On/Standby circuit 58 in the "on" or transmission mode of operation acts as a straight through circuit, i.e. other than providing signal inversion. Thus the 180° window from Nand Gate 13C is tranmitted to Nand Gate 3C and thence to form a 180° gate pulse for gate G4 for SCR G4; in this regard it is to be noted that the window is less than 180° by the selected delay i.e. 60 usec. Likewise the signal from Nor Gate 11A forms the gate signal for gate G1 via Nand Gate 9B and Inverter 4D; the signal from three input Nand Gate 6C forms the gate signal for gate G5 via Inverter 4E; the signal from Nor Gate 11B forms the gate signal for gate G2 via Nand Gate 3A (connected simply as an inverter) and Nand Gate 3B; the signal from Nand Gate 13D forms the gate signal for gate G6 via Nand Gate 3D; and the signal from Nor Gate 11C forms the gate signal for gate G3 via Nand Gate 9C and Inverter 4F.

The 180° window for the load devices are necessary to insure that the Inverter 16 will operate into any power factor load. One reason is that the Inverter 16 operates into high Q tuned circuits (TA, TB and TC) and any deviation from the resonant frequency will give a lagging or leading power factor. In addition the 180° window is needed to insure that the load SCRs 1-6 can be triggered as required. There is a condition during which the magnitude of the phase backfeed current will exceed the phase current of Inverter 16 thereby maintaining one or more of the load SCRs 1-6 non conductive; however, as far as the system is concerned, the backfeed current provides an effect that simulates the appropriate load SCRs 1—6 being conductive. However, this phenomenon can occur over an extended time period since the period of the backfeed current is greater than that of signal fo or fo'; thus if a window of conventional duration were used to trigger the load SCRs 1—6 there could occur a situation in which the backfeed current would maintain the load SCR off for the duration of its trigger pulse and after the backfeed current diminished in magnitude the SCR still could not conduct, i.e. absence of gate signal. By providing a window of a duration almost equal to 180°, conduction of the load SCRs 1-6 is assured in any backfeed current situation where it falls below the SCRs' conducting amplitude. This is to prevent current imbalance in the primary windings PA, PB and PC of isolation transformer 50 which could result in core saturation as discussed earlier.

The prior discussion has indicated the "on" or transmission mode in which the system is already in operation.

The system 10 can have two forms of operation, one during transmission or the 'on' condition and the other being a standby condition. During the 'on' condition the rhythm is injected via plant operation and the coded pulse results; in the standby condition rhythm is not being injected and no transmission is occurring. It should be noted that since the rhythmic pulsing is in effect going from a transmit to a non-transmit stage, the system in the non-transmit portion of rhythmic pulsing is the same as in the standby condition. As noted in the standby or non-transmit condition the backfeed current is handled by maintaining the lower bank of load SCRs 2, 4 and 6 in full conduction (not pulsed or cycled) since commutation is inhibited. In addition to handling the backfeed current, the system must be turned 'on' and 'off' in a preselected sequence (i.e. "on" with beginning of Phase A, "off" with end of Phase C) to assure that no current imbalance occurs with the attendant problems of saturation of the core of transformer 50.

The code is transmitted via input R/S and resistor R26 to input D of Flip Flop 8B; the transmit or rhythm signal is shown in FIG. 2. When no code is being transmitted the system is on standby. Let us then look to the standby or non-transmit mode and the handling of the backfeed current. In the standby mode of operation the data input to a "D" Flip Flop 8B is low driving $\overline{Q}$ output of Flip Flop 8B high. This is transmitted through Inverter 12E via Resistor R25 giving a low to the data inputs of 'D' Flip Flops 7A, 7B and 8A. The next positive clock transition of each input will clock this low data to the Q output of the noted flip flops. This subsequently puts a low on Nand Gates 9A, 10C and 10D forcing their outputs to stay high. An example would be a positive edge of Inverter 12D clocking the low data of Flip Flop 7A over to its Q output. This low output puts a low on one input to Nand Gate 9A before the high signal gets to its other input, keeping the output high and therefore precluding the gate signal to gate G2A; this prevents commutation SCR 2A from turning on. In addition the Q output of Flip Flop 7A is connected through Nand Gate 6C and associated Inverted 4E and Nand Gate 3B to continuously gate load SCR 2 and to hold off load SCR 5. Therefore, load SCR 2 is not commutated off and will continuously conduct while load SCR 5 is not triggered on. In the same manner commutating SCRs 4A and 6A, load SCRs 1 and 3 are held off. As noted the load SCRs 2, 4 and 6 are continuously triggered to be conductive while the commutating SCRs 1A, 3A and 5A are operatively triggered at 'fo' in their normal sequence. The load SCRs 1, 3 and 5 are held off. The above provides a path for the backfeed current and also insures the proper polarity in the commutating capacitors CaA, CaB and CaC. Thus the load SCRs 2, 4 and 6 and associated ones of the free wheeling diodes D1-D6 handle backfeed current and let it circulate through the primary windings PA, PB and PC of the isolation transformer.

The transition from the standby mode of operation to "on" or transmit mode of operation and back again are accomplished through the same On/Standby Section 58. The transition from standby to "on" or transmit is accomplished as follows. The D input of Flip Flop 8B in the standby condition is low. When the data input is raised high, i.e. +10 v, the $\overline{Q}$ output of Flip Flop 8B goes low with the next pulse (fo + 120°) from pin 6 of counter 14A. After approximately one micro second the data inputs of Flip Flops 8A, 7C and 7B go high. This delay is caused by R25 and the input capacitance of Inverter 12E. The next even commutating SCR gate signal from Inverter 12F is allowed to trigger SCR 4A and commutate load SCR 4 which starts the normal sequence. Load SCR 1 is triggered after the time delay, i.e. 60 micro seconds, and the operation of load SCRs 2-6 follows in sequence. As noted the Q outputs of Flip Flops 7A, 7B and 8A have kept all load SCRs in the proper triggering sequence for the standby condition. When the data inputs of Flip Flops 7A, 7B and 8A went high the Q outputs would go high with the next clock input. With the Q outputs of Flip Flops 7A, 7B and 8A high, the system goes from the standby or non-transmit to the "on" or transmit condition. In like manner the transition from the transmit or "on" mode to the standby mode occurs. The data input of Flip Flop 8B is forced low and the $\overline{Q}$ output goes high with the next pulse from pin 6 of counter 14A (signal fo + 120°). After approximately 1 micro second the data inputs of Flip Flops 8A, 7A and 7B go low and the Inverter 16 follows the shut down sequence where the negative pole of phase C is the last to conduct. Again the logic forces the Inverter 16 to start with the positive phase A and stop with the negative phase C insuring a balanced three phase output.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a load management system for providing an audio frequency signal onto a three phase electrical line the improvement comprising: solid state inverter means actuable to one condition for providing a three phase signal from a d-c source and to another condition for not providing said three phase signal and comprising a plurality of unidirectional current controlled conduction solid state load devices, a three phase isolation transformer connecting said inverter means to the electrical line, control means including at least two of said controlled conduction solid state devices for providing a low impedance path for backfeed current from the electrical line during said another condition.

2. The system of claim 1 with said solid state inverter means comprising six said solid state devices, with three said solid state devices being maintained conductive during said another condition for providing said low impedance path for the backfeed current.

3. The system of claim 2 with said solid state inverter means comprising a plurality of diodes connected with said solid state devices and, with said three devices, defining said low impedance path.

4. In a load management system for providing an audio frequency signal onto a three phase electrical line the improvement comprising: solid state inverter means actuable to one condition for providing a three phase signal from a d-c source and to another condition for not providing said three phase signal and comprising a plurality of unidirectional current controlled conduction solid state devices, a three phase transformer connecting said inverter means to the electrical line, said three phase signal having each phase occur in a predetermined phase relationship with the other phases, control means for switching said system from said other condition to said one condition always in a first preselected sequence beginning with the same one of said three phases.

5. The system of claim 4 with said control means switching said system from said one condition to said other condition always in a second preselected. sequence.

6. The system of claim 4 with said other condition being terminated at the end of cycle of said three phase signal.

7. The load management system of claim 1 with said solid state inverter means including commutating means comprising a plurality of unidirectional current controlled conduction solid state commutating devices for commutating said load devices, said control means actuating associated ones of said commutating devices a preselected interval prior to actuation of said load devices whereby simultaneous actuation of serially connected ones of said load devices is precluded.

8. In a load management system for providing an audio frequency signal onto a three phase electrical line the improvement comprising: solid state inverter means for providing a three phase signal from a d-c source and comprising a plurality of unidirectional current conducting solid state devices actuated by gate signals, oscillator means for providing a first single phase signal having a frequency six times that of said gate signals, divide means for dividing said first signal by an integer providing a plurality of gate signals 60° apart for actuating said solid state devices in a three phase manner.

9. In a load management system for providing an audio frequency signal onto a three phase electrical line the improvement comprising: solid state inverter means actuable to one condition for providing a three phase signal from a d-c source and to another condition for not providing said three phase signal and comprising a plurality of unidirectional current controlled conduction solid state devices actuated by gate signals at a selected frequency, a three phase isolation transformer connecting said inverter means to the electrical line, said gate signals having a duration of approximately 180 electrical degrees whereby firing over an extended period is assured and whereby unbalanced conduction of said solid state devices to said isolation transformer by backfeed current through said devices is minimized.

10. In a load management system for providing an audio frequency signal onto a three phase electrical line the improvement comprising: solid state inverter means actuable to one condition for providing a three phase signal from a d-c source and to another condition for not providing said three phase signal and comprising a plurality of unidirectional current controlled conduction solid state devices, oscillator means for providing a single phase signal of a frequency for determining the frequency of said three phase signal, means for selectively varying the frequency of said single phase signal and hence for varying the frequency of said three phase signal.

11. The system of claim 10 further comprising means for transmitting said selected single phase signal to another load management system and to provide synchronization therewith.

12. In a load management system for providing an audio frequency signal onto a three phase electrical line the improvement comprising: solid state inverter means actuable to one condition for providing a three phase signal from a d-c source and to another condition for not providing said three phase signal and comprising a plurality of unidirectional current controlled conduction solid state load devices, a three phase isolation transformer connecting said inverter means to the electrical line, said three phase signal having each phase occur in a predetermined phase relationship with the other phases, control means for switching said system from said other condition to said one condition in a first sequence beginning with a predetermined point of a first phase of said three phase signal and switching said system from said one condition to said other condition in a second sequence at a predetermined point of a third phase of said three signal whereby current imbalance through said isolation transformer is obviated.

13. The system of claim 12 with said predetermined point of the first phase being approximately at the initiation of the first phase and with said predetermined point of the third phase being approximately at the end of the third phase.

14. In a load management system for providing an audio frequency signal onto a three phase electrical line the improvement comprising: solid state inverter means for providing a three phase signal from a d-c source and comprising a first plurality of unidirectional current conducting solid state load devices actuated by first gate signals having a preselected frequency, a second plurality of unidirectional current conducting solid state commutating devices associated with said load devices for commutating said load devices to non-conductive conditions in response to second gate signals at said preselected frequency, oscillator means for providing a first single phase signal having a frequency six times that of said preselected frequency, first divide means for dividing said first signal by an integer providing said first gate signals 60° apart for thereby actuating said solid state load devices in a three phase manner, second divide means for dividing said first signal by an integer providing said second gate signals 60° apart for thereby actuating said commutating devices in a three phase manner, and time delay means for providing a preselected time delay between said first and second gate signals.

* * * * *